C. O. HEGGEM.
SPRING WHEEL.
APPLICATION FILED OCT. 17, 1910.
1,139,282.
Patented May 11, 1915.
2 SHEETS—SHEET 1.
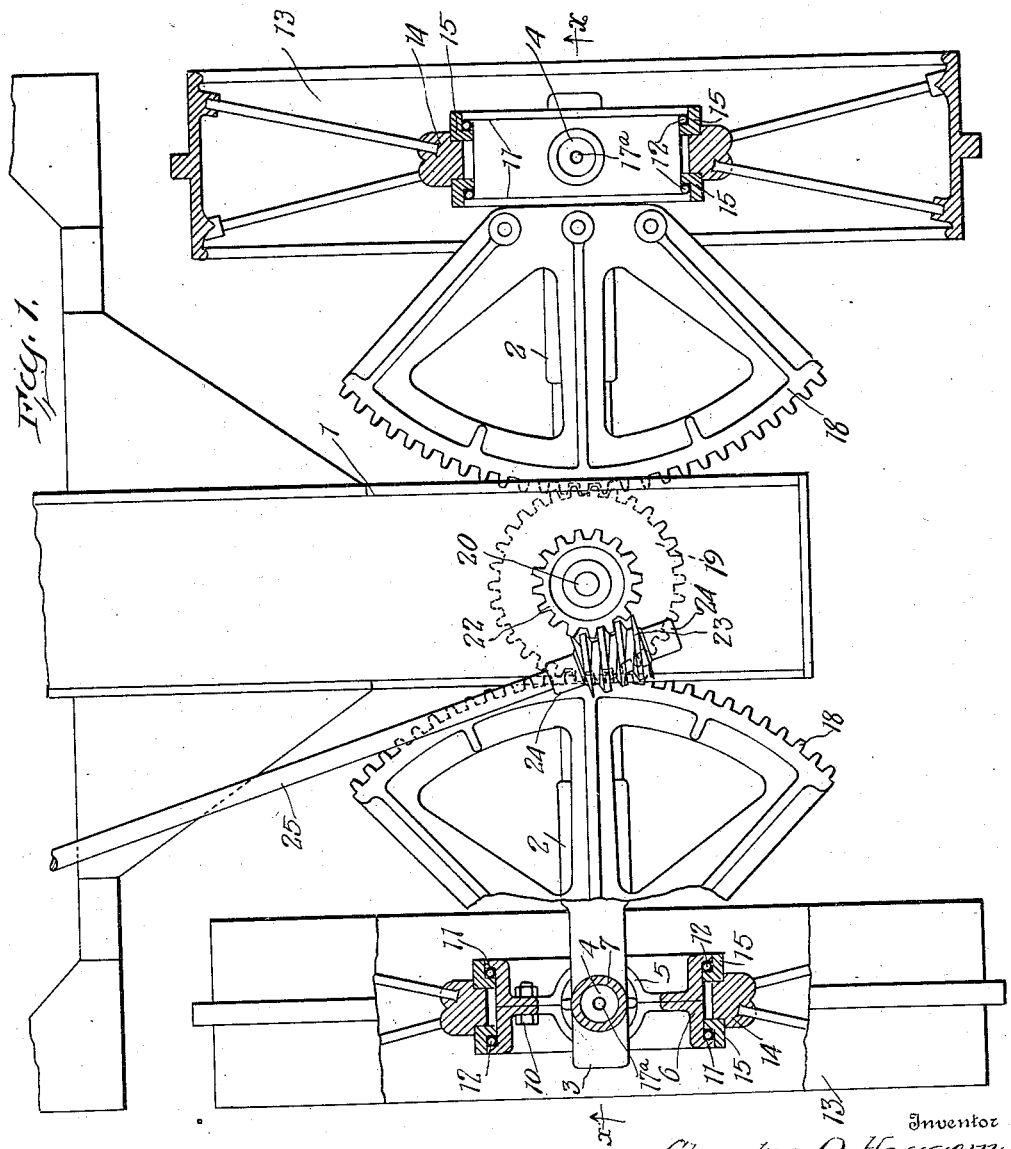
Witnesses
G. Howard Walmsley.
Edward Reed.
Inventor
Charles O. Heggem,
By H. A. Toulmin,
Attorney C. O. HEGGEM.
SPRING WHEEL.
APPLICATION FILED OCT. 17, 1910.
1,139,282.
Patented May 11, 1915.
2 SHEETS—SHEET 2.
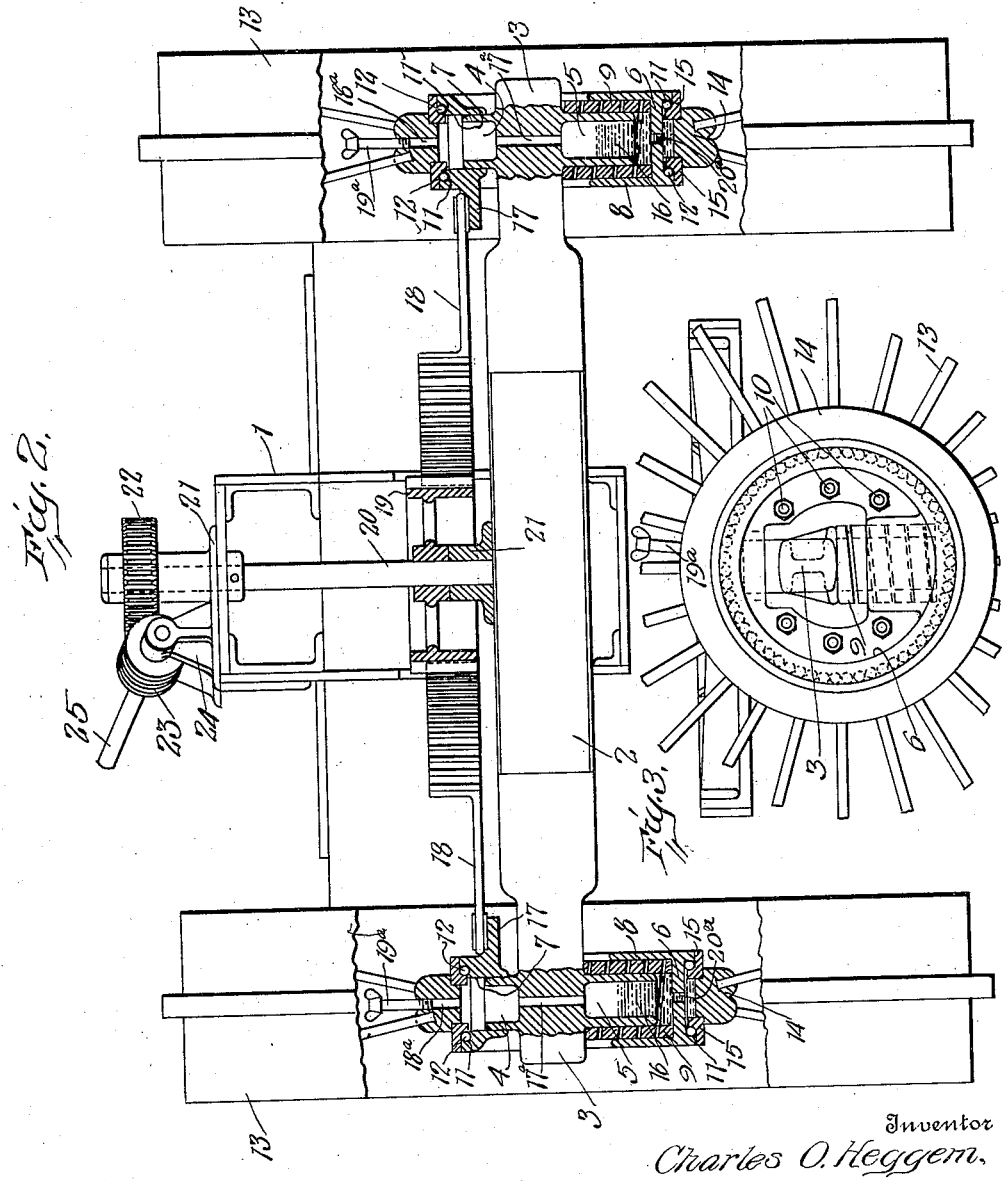
Witnesses
G. Howard Walmsley.
Edward J. Reed.
Inventor
Charles O. Heggem,
By H. A. Toulmin,
Attorney

UNITED STATES PATENT OFFICE.

CHARLES O. HEGGEM, OF MASSILLON, OHIO, ASSIGNOR TO THE RUSSELL AND COMPANY, OF MASSILLON, OHIO, A CORPORATION OF OHIO.

SPRING-WHEEL.

1,139,282.

Specification of Letters Patent. Patented May 11, 1915.

Application filed October 17, 1910. Serial No. 587,491.

*To all whom it may concern:*

Be it known that I, CHARLES O. HEGGEM, a citizen of the United States, residing at Massillon, in the county of Stark and State of Ohio, have invented certain new and useful Improvements in Spring-Wheels, of which the following is a specification, reference being had therein to the accompanying drawings.

This invention relates to spring wheels, and the object of the invention is to provide a wheel of this character which will be very simple in construction, inexpensive to manufacture, of light weight and at the same time possessed of a large degree of strength and durability; further, to provide such a wheel which, when used as a steering wheel, can be very easily manipulated to steer the vehicle to which it is attached and will have its vertical axis arranged centrally thereof; and further, to provide a wheel of this character which will be very easy running, the friction being reduced to a minimum and the wheel being well balanced.

In the accompanying drawings, Figure 1 is a top, plan view of the forward portion of a gasolene traction engine, showing the forward axle provided with two steering wheels, the steering wheels being shown partially in section; Fig. 2 is a vertical sectional view, taken on the line $x$ $x$ of Fig. 1 and looking in the direction of the arrows; and Fig. 3 is an end elevation of the hub of the wheel embodying my invention.

In these drawings I have illustrated one embodiment of the invention and have shown the same as applied to a gasolene traction engine employing two steering wheels, but it will be obvious that the invention is equally adaptable to a tractor or other vehicle employing a single steering wheel. As here shown the forward longitudinal portion of the main frame 1 has rigidly secured thereto a transverse supporting frame 2 which constitutes the front axle and preferably has its outer end portions reduced, as indicated at 3. Connected to each of these end portions of the axle is a bearing member, held against rotation relatively to the axle but having a vertical movement relatively thereto. Extending about and coöperating with this bearing member is a second bearing member carried by the ground wheels. A suitable resilient member is interposed between the axle and the bearing member carried thereby. In the particular construction here illustrated each end 3 of the axle has secured rigidly thereto and preferably formed integral therewith two vertical projections 4 and 5 extending from the top and bottom, respectively, of the axle. An annular bearing member or ring 6 extends about the end of the axle and is provided with an opening of a vertical length greater than the vertical thickness of that portion of the axle which it surrounds. This bearing member is provided with suitable guideways for the end of the axle and these guideways, in the present form, comprise sockets 7 and 8 formed in the bearing member and adapted to receive the projections 4 and 5. The lower socket 8 is of a diameter somewhat greater than the diameter of the lower projection 5 and a spring 9 is coiled about the projection between the same and the inner wall of the recess and coöperates with the socket in guiding the projection and the axle to which it is secured. This spring also receives the weight of that portion of the axle and the part carried thereby and resiliently supports the same. The bearing member or ring 6 is shown as formed in two parts, the line of division preferably being central of the bearing member and in a plane extending transversely to the axle. The two parts are rigidly connected one to the other by bolts 10. The bearing surface of the bearing member may be of any suitable character. In the present instance it is provided with two race ways 11, arranged on opposite sides of the line of division of the bearing member and adapted to receive a series of antifriction balls 12. The ground wheel, which is indicated at 13, is provided with a large central opening which is preferably formed by a hub 14 which also constitutes a bearing member to cooperate with the bearing member carried by the axle. The bearing surface of this hub member constitutes two angle irons 15 forming ball races which coöperate with the ball races 11 and the balls 12. The inner portions of the angle irons which form these ball races extend on the inner side of the ball races of the bearing member 6 of the axle, and, when the wheel has been assembled and the two parts of the bearing member 6 bolted firmly together, the several parts of the wheel will be firmly connected one to the other and the structure so produced will be very strong and very durable. At the same time it is of a very light construction and comprises a minimum number of parts, thereby enabling it to be manufactured at a low cost.

A suitable oil reservoir is provided, as indicated at 16, this reservoir comprising the hollow interior of the socket 8 within which the spring and the guide member 5 are supported. The guide members 4 and 5 of the axle are preferably hollow and are connected one to the other by an aperture 17ª formed in the axle. The hub 14 is provided with an aperture 18ª which is normally closed by a screw plug 19ª. By moving the wheel into a position to bring the aperture 18ª into alinement with the upper hollow guide member or projection 4 oil may be introduced through the aperture 18ª into the projection 4 and then into the oil reservoir 16, where it serves to lubricate the spring and the guide member in their movement in the socket. The hollow interior of the socket 8 communicates by a port 20ª with a space between the guide member 6 and the hub 14, thereby permitting the oil to enter this space and reach the ball races, thus also lubricating the balls and their races.

A wheel of the character above described can be used at any point of the vehicle, either as a traction wheel, a steering wheel or an ordinary ground wheel having neither of these functions. In the present instance it is shown as a steering wheel and the bearing member 6 carried by the axle has an inwardly extending lug 17 to which is rigidly secured a toothed segment 18 which meshes with a pinion 19 carried by the lower end of a shaft 20 which is journaled in bearings 21 carried by the forward end of the main frame member 1 and has at its upper end a worm wheel 22 meshing with a worm 23 journaled in bearing brackets 24 and adapted to be actuated by a steering rod 25. When used as a steering wheel the projections 4 and 5 and their coöperating guideways will, of course, be circular in cross section, as is indicated more clearly in Fig. 1, and will form the vertical bearing about which the steering wheels are turned. It will be noted that this bearing is arranged centrally of the bearing members and of the wheel, as distinguished from the overhanging or laterally displaced pivotal bearing common to steering wheels. Consequently, the wheel is much better balanced and is stronger and more durable in its construction.

I wish it to be understood that I do not desire to be limited to the details of construction shown and described, for obvious modifications will occur to a person skilled in the art.

Having thus fully described my invention, what I claim as new and desire to secure by Letters Patent, is:—

1. The combination, with a ground wheel, and an axle having a vertical projection, of an annular bearing member carried by said axle and having a guideway to coöperate with said projection, whereby said bearing member is free to move about a vertical axis relative to said axle, a resilient member confined between said axle and said bearing member, and a second bearing member carried by said ground wheel and coöperating with the first-mentioned bearing member.

2. The combination, with a ground wheel, and an axle having a vertical projection, a bearing member carried by said axle and having a socket to receive said projection, whereby said bearing member is free to move about a vertical axis relative to said axle, a spring interposed between said axle and said bearing member, and a second bearing member carried by said ground wheel and coöperating with the first-mentioned bearing member.

3. The combination, with an axle having a vertically arranged projection and a bearing member carried by said axle and having a socket to receive said projection, said socket and said projection being circular in cross section, whereby said bearing member is free to move about a vertical axis relatively to said axle, of a ground wheel, and a second bearing member carried by said ground wheel and coöperating with the first-mentioned bearing member.

4. The combination, with an axle having vertical projections extending from the top and bottom thereof, respectively, a bearing member surrounding said axle and having sockets to receive said projections, whereby said bearing member is free to move about a vertical axis relative to said axle, and a spring coiled about one of said projections and arranged between the same and its socket, of a ground wheel, and a bearing member carried thereby and coöperating with the first-mentioned bearing member.

5. The combination, with a ground wheel, and an axle having a depending projection forming a guide, of an annular bearing member carried by said axle and having a hollow guideway to coöperate with said projection, whereby said bearing member is free to move about a vertical axis relative to said axle, said hollow guideway being adapted to contain a lubricant, a second bearing member carried by the ground wheel and coöperating with the first mentioned bearing member, said guideway having an opening therein to permit the passage of lubricant therefrom to the bearing surfaces of said members.

In testimony whereof, I affix my signature in presence of two witnesses.

CHARLES O. HEGGEM.

Witnesses:
ARTHUR L. RASTETTER,
GEORGE W. KINNE.

Copies of this patent may be obtained for five cents each, by addressing the "Commissioner of Patents, Washington, D. C."